United States Patent
Planert

(10) Patent No.: US 10,596,767 B2
(45) Date of Patent: Mar. 24, 2020

(54) METHOD FOR PRODUCING ANCHOR RODS FROM A FIBER COMPOSITE MATERIAL, AND ANCHOR ROD

(71) Applicant: Leonhardt, Andrä und Partner Beratende Ingenieure VBI AG, Stuttgart (DE)

(72) Inventor: Andreas Planert, Chemnitz (DE)

(73) Assignee: Leonhardt, Andrä und Partner Beratende Ingenieure VBI AG, Stuttgart (DE)

( * ) Notice: Subject to any disclaimer, the term of this patent is extended or adjusted under 35 U.S.C. 154(b) by 0 days.

(21) Appl. No.: 16/075,717

(22) PCT Filed: Feb. 3, 2017

(86) PCT No.: PCT/EP2017/052327
§ 371 (c)(1),
(2) Date: Aug. 6, 2018

(87) PCT Pub. No.: WO2017/137313
PCT Pub. Date: Aug. 17, 2017

(65) Prior Publication Data
US 2019/0047184 A1  Feb. 14, 2019

(30) Foreign Application Priority Data

Feb. 9, 2016 (DE) .......................... 10 2016 102 194

(51) Int. Cl.
*B29C 43/48* (2006.01)
*E04C 5/07* (2006.01)
(Continued)

(52) U.S. Cl.
CPC .... *B29C 66/81267* (2013.01); *B29C 35/0805* (2013.01); *B29C 35/10* (2013.01);
(Continued)

(58) Field of Classification Search
CPC ............ B29C 66/81267; B29C 43/224; B29C 43/226; B29C 43/48; B29C 2043/483; B29C 2043/486
See application file for complete search history.

(56) References Cited

U.S. PATENT DOCUMENTS 3,567,541 A * 3/1971 Kaczerginski ......... H01B 13/30
156/172
4,164,439 A * 8/1979 Coonrod .............. B29D 28/005
156/441
(Continued)

FOREIGN PATENT DOCUMENTS

DE  102012108132      1/2015
DE  102015119700 A1   5/2016
(Continued)

OTHER PUBLICATIONS

Raimo Füllsack-Köditz, "Verbundverhalten von GFK-Bewehrungsstäben und Rissentwicklung in GFK-stabbewehrten Betonbauteilen", Institut für konstruktiven Ingenieurbau Bauhaus-Universität Weimar, Nov. 2004.

*Primary Examiner* — Atul P. Khare
(74) *Attorney, Agent, or Firm* — Smartpat PLC

(57) ABSTRACT

A method for producing anchor rods from a fiber composite material includes a solidifying step during which a strand of a curable matrix material with embedded fibers is conveyed to an irradiation device and solidified by an irradiation with light. In a subsequent curing step, the solidified strand is conveyed to an annealing device and is cured by heating to an annealing temperature. A portion of the cured strand forms an anchor rod. The strand is continuously conveyed past or into the irradiation device in a depression of a circulating conveyor belt. The depression of the conveyor belt comprises profiled inner wall regions, via which, during the solidifying step, a surface profiling of the strand con- (Continued)

veyed therein is effected. The conveyor belt consists of a light-permeable material, so that multiple illumination devices can illuminate the strand conveyed on the conveyor belt from various directions.

15 Claims, 2 Drawing Sheets

(51) Int. Cl.
    *B29C 65/00*     (2006.01)
    *B29C 70/52*     (2006.01)
    *B29C 43/22*     (2006.01)
    *B29C 35/10*     (2006.01)
    *B29C 35/08*     (2006.01)
    *B29C 71/02*     (2006.01)
    *B29K 309/08*     (2006.01)

(52) U.S. Cl.
    CPC .......... *B29C 43/224* (2013.01); *B29C 43/226* (2013.01); *B29C 43/48* (2013.01); *B29C 70/521* (2013.01); *B29C 71/02* (2013.01); *E04C 5/07* (2013.01); *E04C 5/073* (2013.01); *B29C 2035/0827* (2013.01); *B29C 2043/483* (2013.01); *B29C 2071/022* (2013.01); *B29K 2309/08* (2013.01)

(56) References Cited

U.S. PATENT DOCUMENTS

| | | | | |
|---|---|---|---|---|
| 4,186,044 A * | 1/1980 | Bradley | ................ | B29C 43/224 156/275.5 |
| 4,194,873 A | 3/1980 | Killmeyer | | |
| T101,401 I4 * | 1/1982 | Zion | ................ | 156/166 |
| 4,382,056 A * | 5/1983 | Coonrod | ................ | B29C 70/504 156/169 |
| 5,026,447 A * | 6/1991 | O'Connor | ................ | B29C 70/52 156/166 |
| 5,264,060 A * | 11/1993 | Lambing | ................ | B29C 70/526 156/180 |
| 5,626,700 A * | 5/1997 | Kaiser | ................ | B29C 70/081 156/166 |
| 5,632,837 A * | 5/1997 | Carmien | ................ | B25G 1/10 156/172 |
| 5,820,804 A * | 10/1998 | Elmaleh | ................ | B29C 33/308 264/167 |
| 5,876,553 A * | 3/1999 | Kaiser | ................ | B29C 70/525 156/180 |
| 6,023,903 A * | 2/2000 | Stecker | ................ | B29C 70/525 52/414 |
| 6,221,295 B1 * | 4/2001 | Kaiser | ................ | B29C 70/525 156/180 |
| 6,800,164 B2 * | 10/2004 | Brandstrom | ................ | B29C 70/526 156/166 |
| 7,651,645 B2 * | 1/2010 | Taylor | ................ | B29C 44/306 264/46.2 |
| 8,123,515 B2 * | 2/2012 | Schleelein | ................ | B29C 70/525 156/245 |
| 8,752,224 B2 * | 6/2014 | Ortiz | ................ | B29C 70/70 156/242 |
| 9,149,993 B2 * | 10/2015 | Gibson | ................ | B29C 70/52 |
| 9,387,605 B2 * | 7/2016 | Tsukamoto | ................ | B29C 35/0805 |
| 10,086,542 B2 * | 10/2018 | Taylor | ................ | B29C 44/306 |
| 10,343,311 B2 * | 7/2019 | Schinkinger | ................ | B29C 70/521 |
| 10,369,754 B2 * | 8/2019 | Biland | ................ | B29C 70/523 |
| 2015/0204075 A1 | 7/2015 | Tsukamoto | | |
| 2016/0089820 A1 * | 3/2016 | Schinkinger | ................ | B29C 70/521 264/172.11 |

FOREIGN PATENT DOCUMENTS

| | | |
|---|---|---|
| EP | 0427111 B1 | 1/1998 |
| JP | H05147117 A | 6/1993 |
| JP | H06293079 A | 10/1994 |
| WO | 2014183146 A1 | 11/2014 |

* cited by examiner

METHOD FOR PRODUCING ANCHOR RODS FROM A FIBER COMPOSITE MATERIAL, AND ANCHOR ROD

TECHNICAL FIELD

The invention relates to a method for producing anchor rods from a fiber composite material.

BACKGROUND

An anchor rod which can be used, for example, to reinforce or anchor concrete elements is, in practice, regularly made of metal. Through a suitable surface structuring, for example in the circumferential direction or a bead-shaped formation and groove-like depressions extending at an angle thereto, a form-fitting adhesion effect can be generated between an anchor rod of that type and a concrete element, in which the anchor rod is embedded. In contrast to anchor rods with a suitable surface profiling, only a significantly lower adhesion effect can be obtained with anchor rods which have a smooth rod surface, which adhesion effect can regularly be insufficient for a use of such rods for the reinforcement and anchoring of concrete elements.

Individual attempts have been undertaken to produce such types of anchor rods out of a suitable fiber composite material. An anchor rod produced out of a suitable fiber composite material can have a low distinct weight, and simultaneously a high mechanical load-bearing capacity. In addition, an anchor rod out of a composite fiber material has a very good resistance to moisture and effects of the weather.

Various methods, with which a surface profiling can be effected by a rod-shaped composite fiber material, are described, for example, in the publication "Verbundverhalten von GFK-Bewehrungsstäben and Rissentwicklung in GFK-stabbewehrten Betonbauteilen" by Mr. Raimo Füllsack-Köditz (Institut für konstruktiven Ingenieurbau Bauhaus-Universität Weimar, November 2004). The rod surface can be roughened, for example, by sand blasting. It is likewise possible to provide the rod surface with a surface profiling via a sand coating. A significantly more strongly varying surface profiling can be effected via a loose or tight banding of the rods with fibers, or via an interweaving of the fibers embedded within an anchor rod. It is also conceivable that an anchor rod with an initially smooth surface subsequently receives a surface profiling via the milling of a groove structure, or via the development of a projecting rib structure with the help of additionally applied synthetic resin.

Subsequently applied rib structures out of synthetic resin, which have no connection to the fibers embedded in the anchor rod, can already be sheared off in a low tensive or compressive stress. Through the milling of a rib or thread structure in an anchor rod initially produced with a smooth rod surface, the fibers extending in this area will be damaged or separated, and the fiber adhesion effect inside of the anchor rod, in particular in the region of the surface profiling, will be significantly weakened. It has been shown that the anchor rods provided with a surface profiling with a method of such type can generate or ensure no sufficient adhesion effect to a surrounding concrete element for many application areas. It is presently technically hardly possible, starting from a smooth anchor rod, to subsequently generate a surface profiling, which can effect or ensure a sufficient adhesion effect for anchor rods in concrete elements.

The amount of time necessary for a curing of the matrix material is significant. The generation of the surface profiling is very burdensome and cost-intensive in the known production methods, and particularly in a loose or tight banding of the anchor rods, or in the interweaving of the fibers embedded in the anchor rod during the production thereof. These types of anchor rods out of a fiber composite material, which have a very high tensile strength and are impervious to effects of the weather, in contrast to anchor rods out of metal, are, in practice, hardly used for construction work or restoration work also for these reasons, despite the advantageous characteristics.

That is why it is considered as one object of the present invention to provide an as simple and cost-effective as possible feasible method for producing anchor rods from a fiber composite material.

SUMMARY

This object is solved according to the invention in that, in a solidifying step, a strand out of a curable matrix material, into which fibers are embedded, is supplied to an irradiation device and is solidified by an irradiation with light, and in that the solidified strand is further conveyed into a annealing device and, in a subsequent curing step, is cured by heating to a annealing temperature, wherein a portion of the cured strand forms an anchor rod. Through the use of a matrix material, which can be solidified via an irradiation with light, the strand can, within a short period of time, be solidified, out of an initially liquid or pasty matrix material, with the fibers embedded therein, and here be brought into the desired form. The presently known matrix materials, which make possible a solidifying via irradiation with, for example, UV light or visible light, usually however do not effect a sufficiently solid and mechanically load-bearing connection of the matrix material to the fibers embedded therein. In addition, independently of the respectively used fibers, shadowing effects can arise, which impact the solidifying of the matrix materials via the irradiation with light, particularly in an immediate surrounding area around the fibers. It has been shown that, via a subsequent annealing process, in which the strand, previously solidified via irradiation with light, is heated to a annealing temperature, and is permanently heated over a sufficiently long time, effects an additional curing of the matrix material, and thereby concomitantly, a sufficient mechanical loading-bearing capacity of the anchor rod, so that the anchor rod can be used to reinforce and anchor concrete elements.

Through the irradiation of the still-malleable strand with light, in particular with UV light, the strand can be sufficiently solidified and be provided with a predetermined surface profiling within a very short irradiation period of, for example, two to five minutes. After the solidifying, the strand can, in a simple manner, be handled, or transported and stored, in order to subsequently be supplied to a heating device, with which the curing step is carried out. An unintentional deformation of the already solidified strand is thereby excluded during the curing step. If the strand were to be solidified and cured exclusively through heating in the annealing device, it would take significantly longer until the matrix material in the strand is sufficiently solidified, in order to be able to be subsequently transported and stored in a simple way and without the danger of an undesired deformation. Through the combination of the solidifying of the strand via an irradiation with light and a subsequently performed curing via heating, the advantages of a very rapid solidifying of the strand, with a thereby facilitated handling, are combined with the curing, particularly necessary for anchor rods, and mechanically high load-bearing embedding of the strands in the cured matrix material.

Such a type of anchor rod can be used to reinforce concrete elements and concrete structures. The anchor rod can also, for example, for an anchoring of individual molded parts to one another, or of an individual component to a structure, wherein the anchor rod must not completely be embedded in a molded part or component, but rather, if necessary, merely engage with a portion, usually an end portion with the molded part or component. The anchor rod according to the invention is advantageously suitable for the receiving and transmission of tensile forces.

Preferably, it is provided that the strand is continuously supplied to the irradiation device. The fibers soaked and wetted or encased with the matrix material can be formed into a strand, and be continuously supplied to the irradiation device, in order to produce a solidified continuous strand. Through the use of a suitable matrix material, which makes a solidifying, activatable via light, and in particular via UV light, possible within minutes, the continuous strand can, with a transport speed adjusted thereto, be conveyed past an illumination device, or multiple illumination devices within the irradiation device, and be solidified here. The use of separate tools for the production of the individual anchor rods, an in particular a manual placement of fibers into individual forms or tools, with which a single anchor rod can respectively be produced, is not required. As a desired surface profiling can already be generated during the solidifying step, no additional effort is needed for an otherwise necessary loose or tight banding or subsequent generation of the surface profiling.

With respect to the continuous production of anchor rods, it is advantageous that, according to one configuration of the inventive idea, in an impregnating step, a bundle of fibers is impregnated with the matrix material and is brought together into a strand, which is subsequently supplied to the irradiation device. The individual fibers can here be unwound, for example from a storage drum or from multiple supply rolls, and be diverted via multiple diverting rolls, and here can initially be impregnated with the matrix material, and after that can be supplied to the irradiation device. The fibers can, for example, be fibers out of glass, out of aramid, out of carbon. It is basically conceivable to use fibers out of natural or renewable raw materials, such as for example hemp or flax. Fibers out of basalt material are particularly advantageous for use in anchor rods. It is likewise possible that various types of fibers are brought together and connected into a bundle or into the strand.

In a particularly advantageous way, it is provided that the fibers of the bundle, spaced apart from one another, are supplied to an immersing container with the matrix material, and the fibers encased with matrix material are brought together to the strand in the immersing container, or after departing the immersing container. Through the supply of fibers, initially fanned out and spaced apart from other, it can be achieved in a simple way that the individual fibers have sufficient contact with the matrix material during the impregnating step, and are substantially completely surrounded, wetted, and encased by the matrix material before the individual fibers are brought together into the bundle, which subsequently forms the strand.

In order to, in a simple way, be able to shape the strand, and to pre-define it with regard to its diameter, during the solidifying step, it is provided that the strand, in the solidifying step, is conveyed to an irradiation device on a circulating conveyor belt, in a depression of the conveyor belt continuous in a conveying direction. The depression in the conveyor belt can, for example, comprise a rectangular, a U-shaped, or a semicircular cross-section area. It is likewise conceivable that the depression in the conveyor belt, continuous in the conveying direction, has an approximately rectangular or semicircular cross-section area, and comprises a narrow opening slit extending along the conveying direction, so that the conveyor belt can also partially encompass the strand on an upper side facing the opening slit, and therethrough also can pre-define the shape thereof on an upper side of the strand.

Furthermore, it is conceivable and useful for different applications that the continuous depression has no straight course along the conveying direction, but rather, for example, has a wave-shaped or meandering-shaped course, so that the strand solidified therein and the anchor rod produced therefrom also have a wave-shaped or meandering-shaped course, in order to therethrough generate an anchoring effect.

It is expedient that the depression of the conveyor belt comprises profiled inner wall regions, through which, during the solidifying step, a surface profiling of the strand conveyed therein can be pre-defined. The profiled inner wall regions can here continuously extend over the entire depression, or over the entire length of the circulating conveyor belt. It is likewise possible that substantially smooth inner wall regions alternate with profiled inner wall regions. The surface profiling can here be generated in the inner wall regions, for example via beads and grooves extending transversely to the conveying direction, or at an angle hereto. It is likewise possible that the profiled inner wall regions comprise a wave-shaped surface profiling, which is copied and transmitted to the strand. It has been shown that multiple teeth or grooves per centimeter length of the anchor rod, which protrude radially roughly 1 to 2 millimeters, can generate an adhesion effect with a concrete element sufficient for many application areas. Flat, rectangular rod profiles with a tooth-shaped or wave-shaped profiling on the small side walls are particularly advantageously suited for a use as reinforcement of very thin, plate-shaped concrete components. Largely independent of a cross-section area and the shape of a rod profile, such a type of anchor rod can be used in numerous application cases, for a high-strength and reliable reinforcement of concrete elements and concrete structures.

The surface profiling can here be adapted to the respective application case, in order to make possible an as high as possible adhesion effect and power transmission to a component connected thereto. Thus, the surface profiling can be adapted to various compositions during use as an anchor rod in concrete elements. It is likewise possible to designate a force-introducing element, or a traction means on one end of the anchor rod, and to adapt the surface profiling of the anchor rod to power-introducing element or traction means on the provided connecting region.

In order to effect an as uniform as possible solidifying of the matrix material around the individual fibers, already during the solidifying step, it is provided that the conveyor belt consists of a light-permeable material, and that multiple illumination devices illuminate the strand conveyed on the conveyor belt from various directions. The conveyor belt can, for example, consist of a transparent or opaque silicone material. The multiple illumination devices can then illuminate, and therethrough solidify the strand received and conveyed in the depression in the conveyor belt with visible light or with UV light, not only from above via an opening slit, but also transversely to the conveying direction, for example from the sides or from a bottom side.

According to one configuration of the inventive idea, it is provided that, before the solidifying step, additional matrix material is added to the strand via a dosing device. This can be useful in order to pre-define a desired mixing ratio of matrix material and of fibers for the strand embedded therein, or an anchor rod formed therefrom, independently of an, if necessary, preceding impregnating step. Through the dosing device, it can also be ensured that the depression in the conveyor belt can be completely filled with matrix material. In such a way, it can be avoided that, during the continuous production of the solidified strand, local irregularities and regions with too little matrix material inadvertently result, which could lead to a local weakening of the strand and the anchor rod formed therefrom.

It is likewise possible to add a fill material with the dosing device, wherein the fill material can comprise a share of the matrix material, but can, however, likewise consist of a different material or of a mixture, and additionally, can be enriched with additive materials. For example, plastic granulates, sand, mineral-based additive materials, or glass granulate can be added as additive materials, in order to influence the characteristics of the anchor rod produced therefrom.

It is provided that, before, during and after the curing step, the strand is divided into multiple portions, which each form an anchor rod. As a duration of multiple hours in the annealing device is usually required, or at least expedient for a complete curing process, the continuously generated and solidified endless strand can, before supplying into the annealing device, can be separated into individual anchor rods with respectively provided lengths. The individual anchor rods can then be stacked in a space-saving manner and supplied to a heatable interior space of the annealing device.

The invention also relates to an anchor rod out of a fiber composite material, wherein fibers are embedded in a matrix material. According to the invention, it is provided that the matrix material comprises a plastic material, which can be solidified by irradiation with light, and is curable by heating to a annealing temperature. The plastic material may comprise reactive components for this purpose, which can either be activated via irradiation with light, and in particular, via an irradiation with UV light, or via a heating, and induce an crosslinking and curing of the plastic material. Provided a rapid crosslinking can be induced with light, and in particular with UV light, within minutes, not only the curing, but also the preceding solidifying in the solidifying step can be induced through a chemical reaction and crosslinking. It is likewise possible that the plastic material contains a component, which, via irradiation with light, and in particular with UV light, can be activated, and merely effects a solidifying of the matrix material, without inducing a permanent crosslinking and curing of the matrix material. The reactive components responsible for the solidifying and the curing can be adapted to the fibers used in an individual case, to the curing matrix material, as well as to the activating components responsible for the activation of the solidifying and the curing in the matrix material.

According to a particularly advantageous embodiment of the inventive idea, it is provided that the anchor rod comprises fibers out of a basalt material. It has been shown that basalt fibers have particularly advantageous characteristics regarding tensile strength and mechanical load-bearing capacity, which is particularly advantageous for use in anchor rods. In addition, basalt fibers can be easily handled and embedded into the matrix material during the production of the strand, in order to generate an advantageously high adhesion effect, between the fibers and the surrounding matrix material, for anchor rods. With the production method according to the invention, and in particular, with an illumination of the strand occurring from multiple directions during the solidifying step, disadvantageous shadowing effects, as can arise in an illumination of usually opaque, dark basalt fibers, can be avoided.

In order to promote an as large and mechanically load-bearing adhesion effect as possible of the anchor rod with a surrounding molded part, in particular with a surrounding concrete element, it is provided that the anchor rod peripherally comprises at least one region with a surface profiling.

BRIEF DESCRIPTION OF THE DRAWINGS

Subsequently, exemplary embodiments of the inventive idea are explained in greater detail, which are exemplarily represented in the illustrations. They show in.

DETAILED DESCRIPTION

Figure 1:
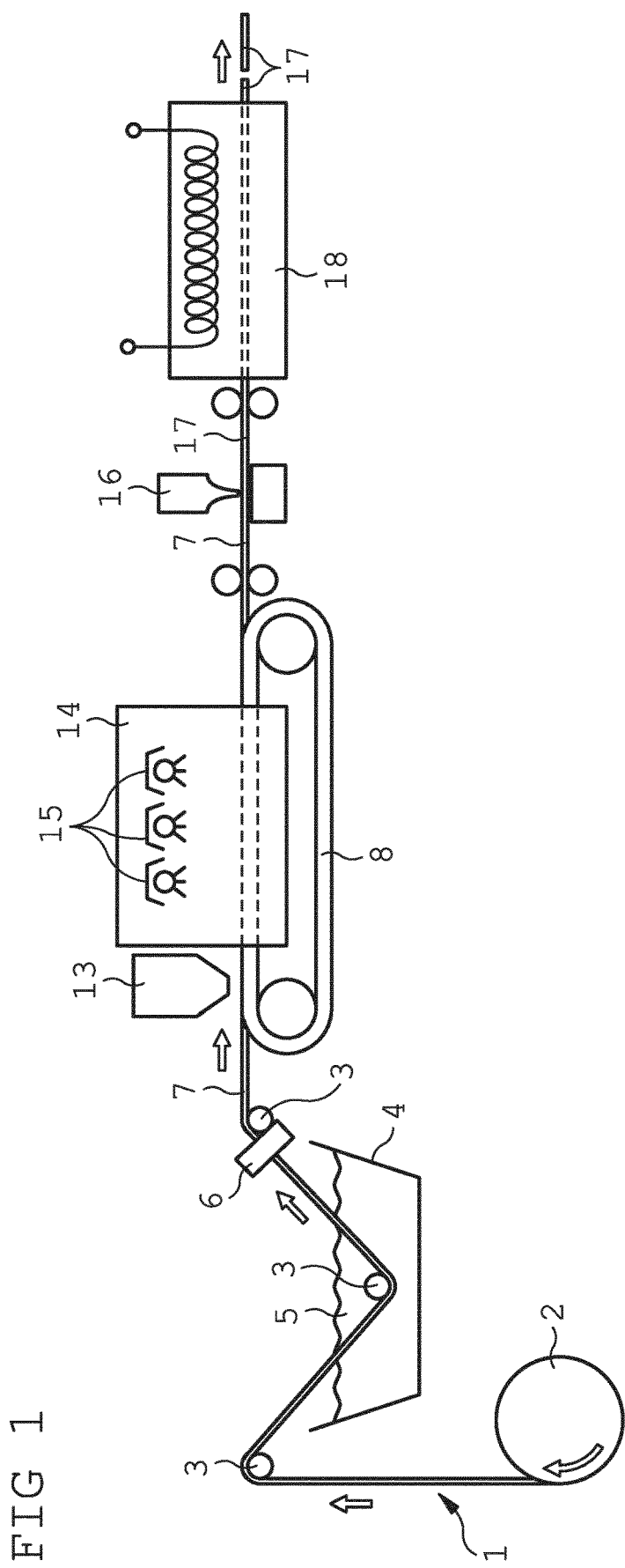
FIG. 1 a schematic representation of the method procedure for the continuous production of anchor rods with a surface profiling out of a fiber composite material.

In a production method according to the invention, and schematically represented in FIG. 1, multiple fibers 1 are unwound from a storage drum 2, and are led, via multiple diverting rolls 3, through an immersing container 4, which is filled with an initially still fluid or pasty matrix material 5. The individual fibers 1 are, after the wetting and encasing with the matrix material 5 in the immersing container 4, supplied to a bundling device 6, with the help of which the individual fibers 1 are bundled into a strand 7.

Figure 2:
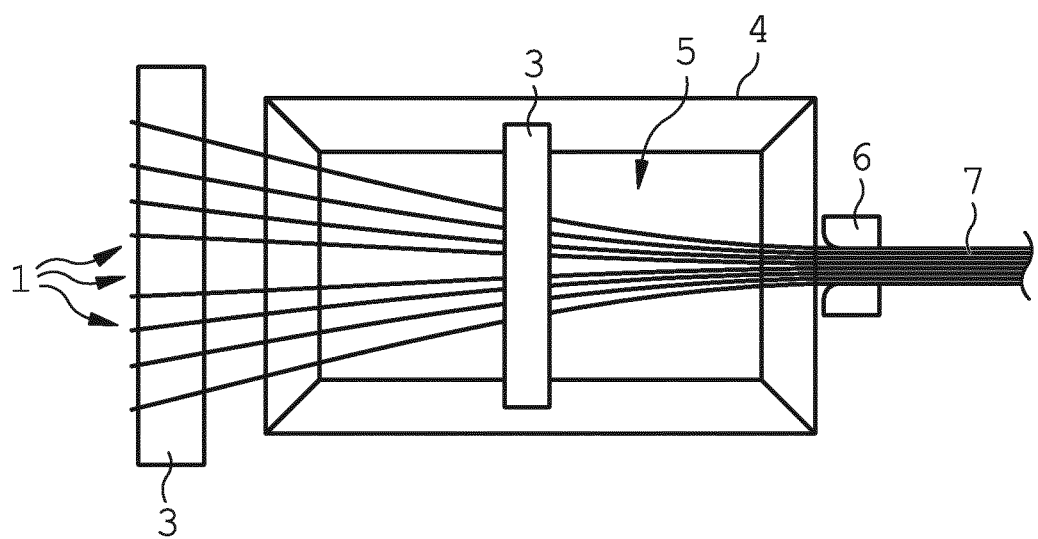
FIG. 2 a schematic representation of a bundle of fibers, which, in an impregnating step, is impregnated and encased with the matrix material.

FIG. 2 schematically shows that the individual fibers 1 are first fanned out, and, distanced from their neighboring fibers 1, are respectively supplied to immersing container 4, so that each fiber 1, spaced from the other fibers 1, is submerged and completely surrounded or wetted by the matrix material 5. The individual wetted fibers 1 are bundled with the bundling device 6 to the strand 7, after departing the immersing container 4.

Figure 3:
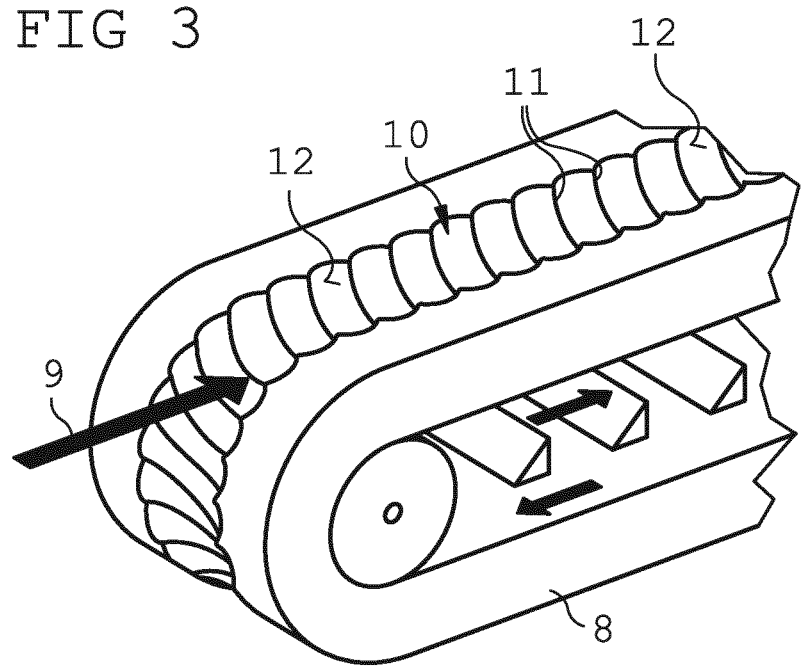
FIG. 3 a schematic representation of an endless-circulating conveyor belt, which enables, in a conveying direction, a continuous depression for the receiving of the impregnated bundle of fibers during a solidifying step.

After that, the strand 7 is supplied to an endless-circulating conveyor belt 8. The conveyor belt 8, which is represented enlarged, in section, in FIG. 3, comprises a continuous depression 10 in a conveying direction made clear with an arrow 9. The depression 10 comprises, uninterrupted, a wave-shaped surface profiling 11 of the inner wall regions 12.

After the strand 7 was supplied to the depression 10 in the conveyor belt 8, matrix material 5 is additionally introduced into the depression 10 with a dosing device 13, in order to completely fill up the depression 10, and to promote or to ensure a molding of the surface profiling 11 of the inner wall regions 13 on the therein embedded strand 7.

The strand 7 is supplied to an irradiation device 14 by the conveyor belt 8. Multiple UV illumination devices 15 are arranged in the irradiation device 14. The individual illumination devices 15, deviating from the schematic representation in FIG. 1, are arranged and directed such that they illuminate, from multiple different directions transverse to the conveying direction 9, the conveyor belt 8 and strand 7 received in the depression 10 therein.

The conveyor belt 8 is produced out of a transparent and elastic silicone material. The illumination devices 15 can therefore irradiate, and thereby solidify the strand 7 not only from above, but also laterally through the conveyor belt 8 with UV light. A length of the irradiation device 14, or the arrangement of the individual illumination devices 15, and a transport speed, with which the conveyor belt 8 circulates and conveys the strand 7 through the irradiation device 14, are pre-defined and adapted to one another such that the strand 7 is sufficiently solidified by the illumination in the irradiation device 14, until it leaves the irradiation device 14 again.

After leaving the irradiation device 14, the strand 7 is divided into individual portions via a separating device 16, which respectively form an anchor rod 17. The individual anchor rods 17 are conveyed to an annealing device 18, in which the anchor rods 17 are heated to a predefined annealing temperature and held at this annealing temperature for the duration of the curing process, until the matric material 5 is completely cured or at least cured sufficiently for the intended use as anchor rod 17.

Since the individual anchor rods 17 already have a surface profiling and have been solidified, so that an undesired deformation of the anchor rods 17 in the further handling and in particular during the curing step does not have to be feared, multiple anchor rods 17 can be supplied to the annealing device 18 and be stacked there, for example, in a space-saving manner, or be stored in a revolver magazine, until the curing process is completed. The number of units that can be produced by means of the method according to the invention per hour, for example, is no longer limited by a manual or automated loading of individual molds, or by the retention time in the annealing device 18, which often lasts multiple hours, but is decisively determined by maximum possible transport speed in the strand production and the retention time in the irradiation device 14, which is often only a few minutes.

The invention claimed is:

1. A method for producing anchor rods from a fiber composite material, the method comprising:
   a solidifying step, in which a strand of a curable matrix material with embedded fibers is conveyed, on a single, endless-circulating UV-light permeable conveyor belt having an uninterrupted depression, to a UV illumination device and solidified by an irradiation with UV light, the depression molding a correspondingly shaped surface profiling on the outer surface of the strand; and
   a curing step, in which the solidified strand is further conveyed into an annealing device and cured by heating the solidified strand to an annealing temperature, wherein a section of the cured strand forms an anchor rod.

2. The method according to claim 1, wherein the strand is continuously supplied to the UV illumination device by the conveyor belt.

3. The method according to claim 2, wherein in an impregnating step, a bundle of fibers is impregnated with the matrix material and is brought together into the strand, which is subsequently supplied by the conveyor belt to the UV illumination device.

4. The method according to claim 3, wherein the fibers of the bundle, while spaced apart from one another, are supplied to an immersing container with the matrix material for said impregnating so as to encase the fibers with the matrix material, and the fibers encased with matrix material are brought together into the strand in the immersing container or after departing the immersing container.

5. The method according to claim 1, wherein the conveyor belt is a circulating conveyor belt having the depression as a continuous depression extending in a conveying direction and within which the strand is arranged for said conveying.

6. The method according to claim 5, wherein the depression of the conveyor belt comprises profiled inner wall regions, which cause, during the solidifying step, the surface profiling of the strand conveyed therein.

7. The method according to claim 5, wherein the irradiation with UV light during the solidifying step is affected by the UV illumination device provided as multiple UV illumination devices which illuminate the strand conveyed on the conveyor belt from various directions.

8. The method according to claim 5, wherein additional matrix material is added to the strand via a dosing device before the solidifying step.

9. The method according to claim 8, wherein the dosing device introduces the additional matrix material to the strand and depression after the strand is supplied to the depression so as to completely fill up the depression.

10. The method according to claim 1, wherein before, during, or after the curing step, the strand is divided into multiple sections which each form an anchor rod.

11. The method according to claim 10,
    wherein the UV illumination device is arranged below the conveyor belt and irradiates the strand with UV light through the conveyor belt.

12. The method according to claim 11,
    wherein the conveyor belt is integrally formed as a single piece made of UV-light permeable material.

13. The method according to claim 12,
    wherein the UV-light permeable material is transparent silicone.

14. The method according to claim 1, wherein the UV illumination device is provided as multiple UV illumination devices arranged and directed such that they illuminate, from multiple directions transverse to the conveying direction of the conveyor belt in addition to through the conveyor belt, the conveyor belt and strand being conveyed thereby.

15. The method according to claim 1, wherein the UV illumination device irradiates to solidify the strand both directly from above in addition to laterally through the conveyor belt.

* * * * *